United States Patent [19]

Peper et al.

[11] Patent Number: 4,498,797

[45] Date of Patent: Feb. 12, 1985

[54] PRESSURIZED CARTRIDGE FOR A WRITING INSTRUMENT

[75] Inventors: Henry Peper, Marblehead; Thomas E. Eaton, Topsfield; Edward J. Ferguson, Avon, all of Mass.

[73] Assignee: The Gillette Company, Boston, Mass.

[21] Appl. No.: 114,157

[22] Filed: Jan. 22, 1980

Related U.S. Application Data

[63] Continuation-in-part of Ser. No. 39,705, May 17, 1979, abandoned.

[51] Int. Cl.³ .......................... B43K 7/00; B43K 7/10; C09D 11/18

[52] U.S. Cl. .................................. 401/141; 401/101; 401/187; 401/190

[58] Field of Search ............................... 401/187–190, 401/101, 141, 142

[56] References Cited

U.S. PATENT DOCUMENTS

| | | | |
|---|---|---|---|
| 378,524 | 2/1888 | Rutherford | 401/187 |
| 1,898,844 | 2/1933 | McGaughy | 401/141 |
| 1,965,753 | 7/1934 | Scoles | 91/62.6 |
| 2,427,069 | 9/1947 | Randolph | 401/141 |
| 2,584,569 | 2/1952 | Frentzel | 401/141 |
| 3,099,252 | 7/1963 | Cofield | 401/190 |
| 3,124,107 | 3/1964 | Fehling | 120/42.4 |
| 3,140,695 | 7/1964 | Fehling | 401/141 |
| 3,425,779 | 2/1969 | Fisher | 401/190 |
| 3,495,917 | 2/1970 | Truhan | 401/141 |
| 3,659,951 | 5/1972 | Germann | 401/190 |
| 3,775,015 | 11/1973 | Tsunoda | 401/190 |
| 3,997,273 | 12/1976 | Germann | 401/190 |

FOREIGN PATENT DOCUMENTS

| | | | |
|---|---|---|---|
| 646258 | 8/1962 | Canada | 401/142 |
| 235077 | 6/1911 | Fed. Rep. of Germany | 401/141 |
| 1297512 | 6/1969 | Fed. Rep. of Germany | 401/142 |
| 6616484 | 5/1968 | Netherlands | 401/142 |
| 262575 | 10/1949 | Switzerland | 401/141 |
| 665764 | 1/1952 | United Kingdom | 401/141 |
| 695861 | 8/1953 | United Kingdom | 401/141 |
| 798897 | 7/1958 | United Kingdom | 401/142 |
| 955260 | 4/1964 | United Kingdom | 401/141 |

*Primary Examiner*—Clyde I. Coughenour
*Attorney, Agent, or Firm*—Leonard J. Janowski

[57] ABSTRACT

A writing instrument cartridge contains a loose fitting ball follower disposed within the cartridge between an end of a column of paste like ink exhibiting a yield value, and compressed gas contained in a sealed end of the cartridge. The ball follower is adapted to help peel the ink from the tube walls without contact and to prevent the gas from channeling through the ink and escaping from the cartridge past a ball point or nib during writing.

1 Claim, 1 Drawing Figure

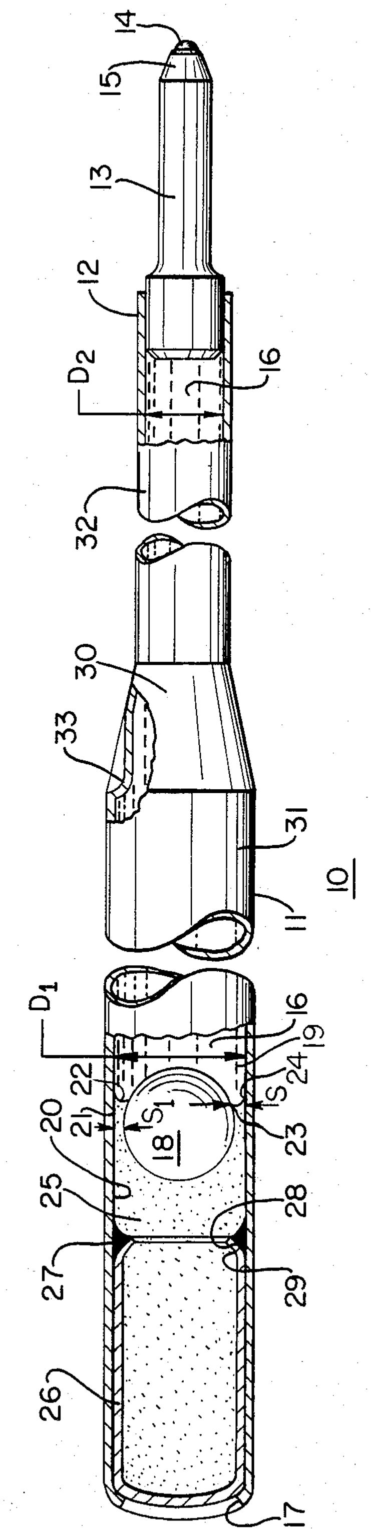
14
15
13
12
D2
16
32
30
33
31
11
10
D1
16
19
24
22
S
21
20
S1
23
18
25
28
27
29
26
17

PRESSURIZED CARTRIDGE FOR A WRITING INSTRUMENT

This application is a continuation-in-part of U.S. patent application Ser. No. 039,705, filed on May 17, 1979, now abandoned.

BACKGROUND OF THE INVENTION

1. Field of the Invention

This invention relates to writing instrument cartridges and, more particularly, to a writing instrument cartridge having a loose fitting ball follower partially immersed in a column of paste like ink exhibiting a yield value and compressed gas contained between the ink and a sealed end of the cartridge.

2. Description of the Prior Art

Known writing instrument cartridges adapted to store and dispense ink on a writing surface include a tubular reservoir connected to a writing ball and socket assembly at one end. A paste like ink is pumped into an open end of the reservoir to form an ink column. The writing ball is rotatably held in the socket and is used to collect and transfer ink as it is rolled across the writing surface.

For the purpose of exerting pressure on the ink, a solid follower in the form of a cylinder or disc is sometimes disposed to fit tightly in the reservoir between the back of the ink column and compressed gas contained in a sealed end of the reservoir. The tight fitting cylindrical follower effectively separates the compressed gas from the ink column whereby the compressed gas forces the solid follower against the back of the ink column to move the ink toward the writing ball and against the reservoir to clean ink from the reservoir walls during the writing process. Thus, the solid follower is intended to move freely and force the ink from the reservoir in response to pressure during the writing process. However, tight fitting solid followers tend to stick in place if the reservoir is dented, whereby the follower can no longer exert pressure on the ink head and the writing instrument ceases to function as intended. Loose fitting cylindrical followers having various end shapes were substituted for the tight fitting solid followers in a pressurized reservoir containing an ink exhibiting a yield value with unsatisfactory results. The compressed gas would sometimes bypass the loose fitting cylindrical follower leaving a heavy buildup on the reservoir wall. The ink in such a writing instrument would not be entirely dispensed during the writing process.

Accordingly, it is desirable to arrange a pressurized writing instrument cartridge to contain an ink with a yield value so as to eliminate the problem of the compressed gas bypassing tight fitting followers to leave a heavy residue on the reservoir wall.

SUMMARY OF THE INVENTION

A pressurized cartridge for a writing instrument comprises a paste like ink exhibiting a yield value, a tubular reservoir having an inner wall for containing the ink, and ink dispensing means connected to one end of the reservoir for dispensing the ink. Follower means is disposed within the reservoir to float partially submerged in the ink and be separated from the reservoir wall to form a channel for containing the ink and causing plug flow while the ink is being dispensed. The ink has a first contact angle at an interface between the ink and follower means different from a second contact angle at an interface between the ink and the reservoir wall. The follower means is shaped to reduce viscous drag between the follower means and the ink contained in the channel, whereby ink is peeled substantially cleanly away from the reservoir wall while the ink is being dispensed. Compressed gas is contained in a chamber at an opposite end of the reservoir for forcing the ink to move toward the ink dispensing means and the follower means to rotatably move with the ink.

BRIEF DESCRIPTION OF THE DRAWING

The FIGURE is a partially sectioned longitudinal view of a pressurized cartridge arranged according to the invention.

DESCRIPTION OF THE PREFERRED EMBODIMENT

Referring to the FIGURE, there is shown a partically sectioned longitudinal view of a pressurized cartridge 10 for a writing instrument arranged according to the invention. The cartridge 10 includes a tubular reservoir 11 having one end 12 attached to an ink dispensing means 13 such as a writing ball 14 rotatably held in a socket 15. Before the attachment of the ink dispensing means 13 to the reservoir 11, a paste like ink 16 which exhibits a yield value, such as described in U.S. Pat. No. 4,097,290, is pumped into the open end 12 of the reservoir 11 to form an ink column therein. As used herein, the term "yield value" is intended to mean ink flow will not occur until a critical pressure on the ink column is exceeded. A follower 18 is dropped into the open end 17 of reservoir 11 to be loose fitting while floating partially submerged on top 19 of the ink column 16. The follower 18 is shaped so that the adhesive forces of the ink 16 to the follower 18 are greater than the viscous drag created by the ink 16 contained in a channel 21 between the follower 18 and the inner tube wall 20. It has been determined that a spherical or ball shaped follower significantly reduces the viscous drag between the follower 18 and the ink contained in the channel 21. Other follower shapes, such as conical or hemisperical may be used provided the follower 18 permits a desired plug flow for the ink as described below. The surface of the ball follower 18 in contact with ink 16 is separated from the inner wall 20 of the reservoir 11 by a distance, S, so as to form the continuous channel 21 containing a curved upper surface 22 of the ink column 16, commonly referred to as a meniscus. The loose fit of the ball 18 in the reservoir 11 permits the ball 18 to move past minor indentations in the reservoir 11. The diameter of the ball follower 18 and the level of immersion of the ball 18 on the top 19 of the ink column 16 is selected so that ink 16 contained between the ball follower and the inner wall 20 will flow toward the writing ball 14 as a plug during writing. In particular, the distance, S, is selected so that the shear stress that would be developed within the ink 16 at this distance, S, is less than the yield value of the ink, whereby the ink 16 tends to flow as a plug helping the ink 16 to be peeled cleanly away from the inner wall 20. As used herein, the term "plug flow" refers to the ability of the ink 16 to flow as a large slug wherein adjacent ink particles flow at substantially the same rate as distinguished from laminar flow in which all particles of a fluid move in distinct and separate lines. As an example, the inner wall 20 may be metal and the ball 11 may be formed from polyethylene to cooperate with the composition of the ink 16 to aid plug flow as explained below.

Fatty acids such as stearic and lauric acids are added to the ink 16 to lubricate the ball socket 15 for smoother writing and, it is believed, to adsorb from the ink 16 to the inner metal wall 20 of the reservoir 11. This minimizes the wettability and adhesion of the ink 16 to the metal wall 20. However, the selected fatty acids do not chemisorb on polyethylene, thus allowing the ink 16 to wet and adhere to the ball 18.

The wettability of a solid is directly proportional to the cosine of the contact angle between the solid and a liquid. As used herein, the term "wettability" refers to the ability of any solid surface to be wetted when in contact with a liquid; that is, the surface energy of the liquid-solid interface is reduced by the liquid spreading over the solid surface.

It is believed that the reduction of wettability of the tube wall 20 by the adsorption of fatty acids permits the ink 16 adjacent to the tube wall 20 to flow with the ink plug and cause the ink 16 to be peeled substantially cleanly from the tube wall 20. The wettability of the ball 18 by the ink 16 is not effected by the fatty acids and thus the ink 16 adheres more strongly to the ball 18 and a stable ink-ball interface is maintained. The difference is adhesion or wettability of the ink 16 to the ball follower 18 and the inner wall 20 provides a stable meniscus 22 in the channel 21 having a first contact angle, $B_1$, at the interface 23 and a second contact angle, $B_2$, at the interface 24. In the preferred embodiment, the first contact angle, $B_1$, is 0°, and the second contact angle, $B_2$, is 30°.

The dimensions of the separation, S, the contact angles $B_1$ and $B_2$, and the yield value of the ink are selected for causing plug flow for the ink 16 contained in the channel 20 between the ball 18 and tube 20. The follower 18 is shaped to reduce viscous drag between the follower 18 and the ink contained in the channel 21. The resulting combination enables the ink 16 to be peeled substantially cleanly from the tube wall 20 during the writing process. Only a small residue of ink 16 adheres to the ball follower 18. As an example, the tubular reservoir 11 is a metal tubular cartridge with a diameter of substantially 0.172 inch and the paste like ink 16 exhibits a yield value which has a viscosity of 1900 poise at a shear rate of 3.4 $sec^{-1}$. Under normal conditions, the ink 16 does not flow past the writing ball 14 but is fed thereto as the writing ball 14 rotates in the socket 15 and against a writing surface. A polyethylene ball follower 18 with a diameter greater than 0.059 inch is assembled in the cartridge 10 so as to be partially submerged but floating on top of the ink 16. The equator of the ball follower 18 and inner wall 20 of the reservoir 11 are separated by a distance, $S_1$, preferably equal to or between substantially 0.008 to 0.016 inch and less than 0.113 inch to form the capillary channel 21. A preferred distance, S, between where the ball follower 18 contacts the ink 16 and the inner wall 20 is 0.040 inch.

An inert gas is compressed in a chamber 25 between the ball follower 18 and a cup shaped plug 26 inserted into the reservoir rear end 17 then sealed in position by a suitable adhesive bead 27 disposed between a chamfer 28 on an end 29 of the plug 26 and the reservoir wall 20. The adhesive bead 27 is intended to prevent leakage of the gas out the rear end 17 of the reservoir 11. The compressed gas provides a force to the top 19 of the ink column 16 to move the ink 16 and ball follower 18 toward the writing ball 14.

In the preferred embodiment, the pressurized cartridge 10 is adapted to fit within a tapered tubular pen barrel, not shown. In particular, the reservoir 11 includes a tapered tubular section 30 extending between a tube section 31 with a first diameter, $D_1$, and a tube section 32 with a second, smaller, diameter, $D_2$. Internal protrusions 33 are formed in the tapered tubular section 30 to prevent the ball follower 18 from sealing the second tubular section 32 from the compressed gas as the ink column 16 recedes into the second section 32. The protrusions 33 are dimensioned to keep the ball follower 18 from moving into the tapered section 30 yet permit the gas to escape past the ball follower and through a space between the protrusions 33 to force some of the remaining ink 16 in the second section 32 to move toward the writing ball 14. The tapered section 30 also helps to center the ball follower 18 within the reservoir 11 during the filling operation.

A preferred embodiment of a pressurized writing instrument cartridge 10 comprising a tubular reservoir 11 having an ink dispensing means 13 connected to one end 12 and a specially shaped follower 18 loosely disposed within the reservoir 11 to float partially submerged on top 19 of an ink column 16 exhibiting a yield value. The ink 16 adheres more strongly to the follower 18 than the inner wall 20 enabling the ink 16 to be substantially removed from the reservoir wall 20 while being dispensed and preventing compressed gas contained in a chamber 25 from channeling through the ink column 16. Numerous and varied other arrangements can readily be devised in accordance with the disclosed principles.

What is claimed is:

1. A pressurized cartridge for a writing instrument comprising:

a paste-like ink having a yield value; a tubular reservoir having an inner wall for containing said ink;

ink dispensing means connected to one end of said reservoir for dispensing said ink;

follower means loosely disposed within said reservoir to float partially submerged in said ink and be separated from said reservoir wall to form a channel for containing said ink and causing plug flow while said ink is being dispensed, said follower means having a radius of 0.008 to 0.016 inch less than the radius of said inner wall, said follower means being shaped to reduce viscous drag between said follower means and said ink contained in said channel, the wettability of said follower means by said ink being greater than the wettability of said inner wall; and compressed gas contained in a chamber at an opposite end of said reservoir for forcing said ink to move toward said ink dispensing means and said follower means to move with said ink wherein said compressed gas chamber includes a cup-shaped plug having a chamfered end sealed in position at said opposite reservoir end by an adhesive bead disposed between said chamfer and said reservoir wall.

* * * * *